United States Patent [19]

Swenson

[11] Patent Number: 5,566,492

[45] Date of Patent: Oct. 22, 1996

[54] VACUUM DEVICE FOR HARVESTING BRINE SHRIMP EGGS

[75] Inventor: Michael D. Swenson, Salt Lake City, Utah

[73] Assignee: Bruce C. Sanders, Ogden, Utah; a part interest

[21] Appl. No.: 405,346

[22] Filed: Mar. 16, 1995

[51] Int. Cl.⁶ .................................................. A01K 79/00
[52] U.S. Cl. ............................................................ 43/6.5
[58] Field of Search ............................... 43/6.5, 1, 4, 4.5

[56] References Cited

U.S. PATENT DOCUMENTS

| | | | |
|---|---|---|---|
| 1,486,485 | 3/1924 | Frissell | 43/6.5 |
| 3,683,862 | 8/1972 | Reynolds | 43/6.5 |
| 3,768,193 | 10/1973 | London | 43/6.5 |
| 3,940,867 | 3/1976 | Sikich | 43/6.5 |
| 4,193,737 | 3/1980 | Lemmon | 43/6.5 |
| 4,434,572 | 3/1984 | Sheldon et al. | 43/6.5 |
| 4,663,879 | 5/1987 | Bergeron, Jr. | 43/6.5 |
| 4,702,676 | 10/1987 | Westfall et al. | 43/6.5 |
| 4,839,062 | 6/1989 | Sanders | 210/776 |
| 4,998,369 | 3/1991 | Lamon | 43/6.5 |
| 5,042,187 | 8/1991 | Bentzley | 43/6.5 |
| 5,143,629 | 9/1992 | Lint | 210/776 |
| 5,457,908 | 10/1995 | Sanders | 43/6.5 |

*Primary Examiner*—Joseph J. Hail, III
*Assistant Examiner*—Jay A. Stelacone
*Attorney, Agent, or Firm*—Madson & Metcalf

[57] ABSTRACT

The present invention is a novel device for harvesting brine shrimp eggs from the surface of a body of water. In a preferred embodiment, the invention concentrates brine shrimp eggs in a surface layer of a body of water using a system of wedge-oriented booms. The present invention additionally comprises a vacuum system with a nozzle, which has an opening in close proximity to the surface layer of brine shrimp eggs. The vacuum system is capable of creating sufficient vacuum force to lift the surface layer of brine shrimp eggs and water from the body of water. The vacuum nozzle is maintained in close proximity to the surface layer of brine shrimp eggs by a floatation device and a pair of hydraulic rams connected to both the floatation device and the vacuum nozzle. The mixture of brine shrimp eggs and water extracted from the body of water by the vacuum motor is conveyed to a holding tank. From there it is transported to a series of porous storage containers for drainage.

21 Claims, 3 Drawing Sheets

5,566,492

VACUUM DEVICE FOR HARVESTING BRINE SHRIMP EGGS

BACKGROUND

1. Field of the Invention

The present invention relates generally to a device for harvesting brine shrimp eggs from a water body. More specifically, the present invention relates to a vacuum device for removing a surface layer of brine shrimp eggs from a body of water.

2. Technology Review

Brine shrimp are primitive crustaceans which normally inhabit bodies of water having high saline contents such as the Great Salt Lake in Utah. They serve as a source of food for many fish. Brine shrimp eggs are remarkable in that they can be dried and stored and hatched years later by returning them to salt water. The ability to stockpile dried brine shrimp eggs for future hatching makes commercial harvesting of the eggs a profitable venture.

Brine shrimp and their eggs conglomerate in floating colonies at the surface of the water. Brine shrimp colonies typically occupy the top quarter-inch of water. The eggs are extremely small in size, such that an ounce of water may contain several million eggs. This floating layer is eventually carried by the wind and the tide to the shore.

Past harvesting approaches have focused on collection after the eggs had been deposited on the shore. Nets or shovels were used to scoop up the thin layer of shrimp eggs and place them into storage containers. This approach was far from effective, however, as the harvester had to depend on the wind and the tide to bring the eggs ashore. Thus, the harvester had no control over when or where the eggs would be deposited.

To deal with the problem of unpredictability, elaborate fencing structures were erected, extending outwardly from the shoreline, to direct incoming shrimp colonies to preselected harvesting sites on the beach. While noticeably more effective in concentrating colonies at predetermined sites, this method was not, however, without its disadvantages. As an initial problem, these extensive fencing structures were understandably expensive. Additionally, this method required that the harvester have access to large areas of shoreline. Finally, the harvester still, had to wait for the right wind and tide conditions to bring the shrimp eggs ashore.

Because of the disadvantages inherent in shoreline harvesting methods, increasing attention has been directed toward methods for harvesting brine shrimp eggs directly from the water. Such methods usually employ a boat or raft equipped with a collection device.

Previous attempts to harvest brine shrimp eggs directly from the water have utilized an assortment of nets or screening devices to skim the eggs from the surface of the body of water. The collected eggs were then transferred from the nets or screens and into storage containers. U.S. Pat. No. 5,042,187 by Bentzley discloses a netting device to collect brine shrimp eggs from a water surface.

There are a number of problems, however, with devices employing netting or screening procedures to remove brine shrimp eggs from water. As an initial matter, netting or screening is generally inefficient because of the very small size of the eggs. With a concentration typically of several million eggs in a single ounce of water, one can easily imagine how great numbers of the eggs pass through conventional net systems avoiding capture.

As the netting or screening device becomes finer and finer, so as to increase the efficiency of extraction of brine shrimp eggs from the water, additional problems arise. It has been found that eggs cling together and solidify when concentrated, thereby becoming very difficult to remove from the netting.

In addition to these problems, the netting device of Bentzley uses paddles which agitate and disturb the layer of brine shrimp eggs at the water surface. As the eggs become dispersed by the paddles, harvesting efficiency decreases.

Because of the problems inherent in extracting brine shrimp eggs with nets and paddles, attempts have been made to pump the egg-rich, top layer of water directly from the body of water into storage containers. U.S. Pat. No. 4,839,062 by Sanders discloses one such method for harvesting brine shrimp eggs. In Sanders, a wedge-shaped concentrating device, comprising a pair of straight-arm booms, is utilized to concentrate a layer of brine shrimp eggs at the surface of a body of water. As the wedge-shaped concentrating device is moved forward with respect to the eggs, the eggs are channeled towards a skimmer which separates the egg-rich layer from the water. The skimmer contains a height adjustment mechanism to selectively position the skimmer at a depth just below the egg-rich layer, usually less than about one inch below the water surface. In this manner, only the egg-rich, top layer of water is directed to the pumping system.

U.S. Pat. No. 4,998,369 by Lamon also discloses a brine shrimp harvester which selectively pumps the egg-rich, top layer of water to storage containers. In Lamon, the harvesting device provides for the gravity flow of the egg-rich layer of water into a collection vessel. The collection vessel is equipped with an adjustable knife edge inlet dam, which serves to allow only the top layer of water to flow into the collection vessel.

Both Sanders and Lamon, however, suffer certain disadvantages in terms of efficiency in harvesting brine shrimp eggs. In particular, both devices are subject the constant fluctuation of water level, making it extremely difficult to extract only a thin layer of shrimp eggs and water from the surrounding body of water. Bodies of water such as the Great Salt Lake have many perturbations in the surface level as an ever present, naturally occurring phenomenon. Such perturbations may take the form of small ripples in the surface to large undulations, or waves, of greater than two feet in height. Obviously, it would be very difficult, if not impossible, to maintain a skimmer or collection device at a constant, predetermined depth just beneath the water's surface when the surface level is constantly changing.

Brine shrimp egg collecting methods which utilize a pumping system to pump the eggs into porous storage containers depend on a proper ratio of eggs to water in order to function effectively. Too much water results in an inefficient collection of eggs in the storage containers. On the other hand, too little water leads to a slurry that is too dry for the pumping system. Thus, it is important that the harvesting device have a mechanism for maintaining a steady input of eggs and water in the proper ratio.

Existing devices have attempted to provide egg/water ratios in this range, but, as previously noted, efforts to provide a continuous and uniform supply of eggs and water in this ratio have met formidable obstacles.

It will be appreciated that there is a need in the art for a brine shrimp egg harvester which effectively extracts the layer of brine shrimp eggs from the surface of the water regardless of the natural rise and fall of the water's surface perturbations. It would be a further advancement in the art to provide a brine shrimp egg harvester which extracts from the surface of a body of water a relatively uniform ratio of eggs to water without agitating the water's surface. Finally, it would be a still further advancement to provide a device that performs these functions in an efficient, cost-effective, commercial manner.

SUMMARY OF THE INVENTION

The present invention discloses a novel device for harvesting brine shrimp eggs from the surface of a body of water. The device uses a vacuum apparatus to directly remove eggs from the water surface without agitating the water. The device is also self-adjusting to the natural rise and fall of the water surface, thereby enabling one to extract a relatively uniform ratio of eggs/water from the surface layer of water. As used herein, the term "self-adjusting" means that the device will rise and fall with the movement of the water surface such that the spatial relationship between the device and the water surface is maintained despite waves, ripples, or other undulations in the water surface. The harvesting device permits the ratio of eggs/water to be easily changed to yield a wetter or dryer mixture of eggs, depending on the desires of the harvester.

In one preferred embodiment of the invention, the device comprises a means for concentrating brine shrimp eggs in a surface layer of a body of water. Although the device may be employed to extract brine shrimp eggs without the use of such a concentrating means, it is found that the harvesting of eggs is much more efficient, and, hence, more economical, when a means for concentrating the shrimp eggs at the surface is employed.

While a variety of concentrating means are imaginable, it is presently preferred to utilize a channeling structure which is adapted to receive water and brine shrimp eggs at a wide receiving end, and to channel the shrimp eggs toward a narrow concentrating end. The channeling structure may, for example, take the form of a boom system, wherein a pair of diverging, wedge-oriented booms define the forward, receiving end and the rearward, concentrating end of the channeling structure. In a presently preferred embodiment, wedge-oriented booms are configured such that as the booms move forward in relation to the floating brine shrimp eggs, the eggs are received into the wide forward end of the channeling structure and as the booms continue forward, the eggs are channeled into an increasingly narrow space until they are concentrated at the rearward end of the channeling structure The present invention additionally comprises a vacuum system with a nozzle, which has an opening in close proximity to the surface layer of brine shrimp eggs. The vacuum nozzle is preferably located at the rearward, concentrating end of the channeling structure where brine shrimp eggs have been concentrated to form a relatively dense layer at the surface of the water.

The vacuum nozzle may be any one of a variety of shapes and forms, such as elongated, circular, oval, or rectangular. Regardless of the shape or form, however, it is presently preferred that the nozzle's opening be in close proximity to the surface layer of brine shrimp eggs. A proximity of 0 inches to 12 inches above the surface layer is presently desirable. The exact operating height will vary according to several factors, including the power of the vacuum system, the size of the nozzle opening, the density of brine shrimp eggs at the water's surface, and the desired egg/water ratio.

The present invention further comprises a means for maintaining the vacuum nozzle in close proximity to the surface layer of brine shrimp eggs. In a currently preferred embodiment, the nozzle is attached to floats which permit the nozzle to float freely such that the nozzle moves up and down with the natural rise and fall of the water surface. In this way, the nozzle is maintained at a relatively consistent height above the water's surface, even when faced with perturbations, such as small waves, in the water's surface.

At least one electric or hydraulic ram preferably connects the nozzle to the floats so that the height of the nozzle above the water surface may be adjusted. By varying the height of the nozzle in relation to the water's surface, a harvester may extract different ratios of egg/water from the body of water. A relatively greater height of the nozzle from the surface (such as, for example, 8 inches to 12 inches) will yield an extract with a high egg/water ratio. Conversely, a lower height of the nozzle from the surface (such as, for example, 1 inch to 3 inches) will extract a larger amount of water along with the eggs, thus yielding a lower egg/water ratio.

It is found in the art that a desirable egg/water ratio for the efficient harvesting of brine shrimp eggs is somewhere between 300 grams/liter and 1500 grams/liter. More specifically, a ratio of 600 grams/liter to 1100 grams/liter is preferred. The device of the present invention provides a means for consistently extracting a mixture of eggs and water with a ratio in the preferable range.

The vacuum system preferably creates sufficient vacuum force to lift the surface layer of brine shrimp eggs and water from the body of water. It is preferred that the vacuum system have at least one blower which can generate sufficient air flow rate, typically in the range from 100 to 10,000 cubic feet per minute (cfm) and an air speed in the range from 2000 to 12,000 feet per minute (fpm). Those skilled in the art will appreciate that cfm is equal to the product of fpm and the hose cross-sectional area. Typical hose diameters range from about 4 inches to 12 inches, with a diameter from 8 to 12 inches being preferred. Of course, the hose diameter can be larger than 12 inches, but a large hose size will result in lower fpm for a given cfm. Both high and low pressure differential vacuum systems may be used in the present invention. However, it is currently preferred to use a vacuum system which produces a high flow rate at a low pressure differential. A vacuum system similar to well known "shop vacuum" systems, is suitable for this purpose.

The mixture of brine shrimp eggs and water extracted from the body of water by the vacuum system is preferably conveyed to a holding tank connected to the vacuum system. The present invention preferably includes a pumping system for conveying the brine shrimp egg and water mixture from the holding tank to a series of porous storage containers. Optionally, the mixture of brine shrimp eggs and water may be conveyed directly from the vacuum system to the pumping system without the need for a holding tank. If the product within the holding tank is too dry to efficiently pump, additional water is preferably added to render the brine shrimp egg slurry pumpable.

The advantages of this unique harvesting device are apparent when considering the existing technology in the brine shrimp harvesting industry. The present invention provides a device which enables extraction of a mixture of brine shrimp eggs and water directly from the surface of a body of water without agitation of the water. In addition, the device provides a means for controlling the egg/water ratio of the mixture under a variety of changing conditions.

This ability to extract a relatively consistent mixture of brine shrimp eggs and water and adjust the consistency quickly and easily, is important in the brine shrimp egg harvesting industry. A slurry which is too watery results in inefficient collection of eggs in porous storage containers. A mixture that is too dry will cause agglomeration of the eggs, ineffective pumping of the eggs, and, eventually, pump failure.

Significantly, the present invention provides a device which can extract a egg/water slurry with a relatively uniform consistency even when faced with a body of water having many surface perturbations, such as waves and ripples. This represents a substantial improvement in the art, and presents a solution to a problem heretofore unsolved in the art.

Finally, the harvesting device of the present invention provides a mechanism for harvesting brine shrimp eggs in a commercial fashion, and enables the harvesting to be completed in a simple, efficient and cost-effective manner.

DESCRIPTION OF THE DRAWINGS

A more particular description of the invention briefly described above will be rendered by reference to the appended drawings. Understanding that these drawings only provide information concerning typical embodiments of the invention and are not therefore to be considered limiting of its scope, the invention will be described and explained with additional specificity and detail through the use of the accompanying drawings, in which.

DETAILED DESCRIPTION OF THE PREFERRED EMBODIMENTS

Figure 1:
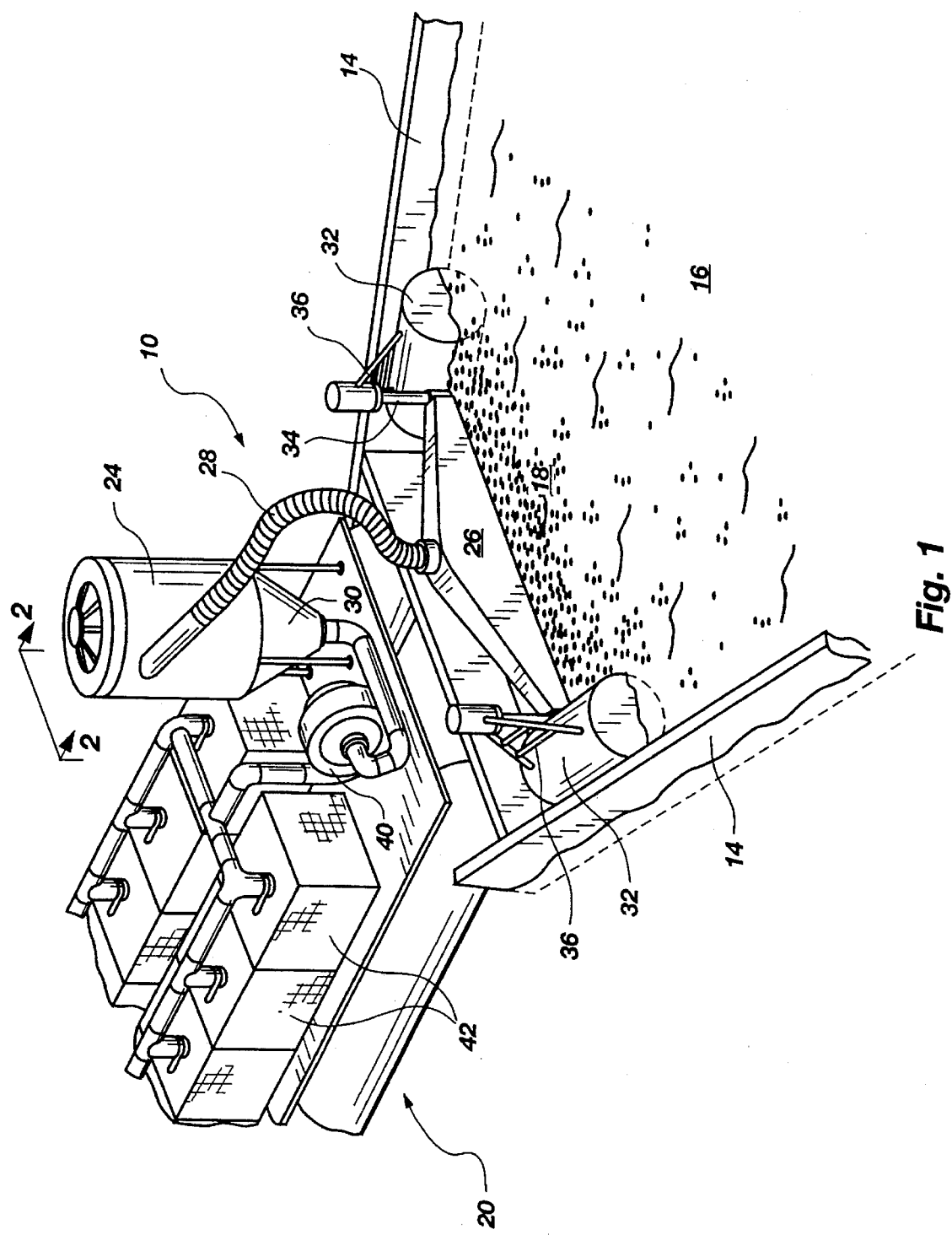
FIG. 1 is an elevated perspective view of one possible vacuum harvesting device within the scope of the present invention.

Reference is now made to the figures wherein like parts are referred to by like numerals throughout. With particular reference to FIG. 1, a brine shrimp harvesting device according to the present invention is generally designated at 10.

In a presently preferred embodiment, the harvesting device 10 has a concentrating device consisting of a system of booms 14 configured in the shape of a wedge. The forward end 16 is wider than the rearward end 18. As the booms move forward in relation to the floating brine shrimp eggs, the eggs are received into the wide forward end 16 of the channeling structure and as the booms continue forward, the eggs are channeled into an increasingly narrow space until they are concentrated at the rearward end 18 of the channelling structure.

Depending on the size of the booms 14 being used and the conditions on the water, the booms 14 may move forward under the power of a harvesting boat 20 to which the concentrating device is connected. The booms 14 may also be equipped with driving devices (not shown) so that they can move forward, either partially or fully, under their own power. It will be appreciated by those with skill in the art that this invention may be practiced with many types of boats utilizing many different means of forward or rearward motion.

In the presently preferred embodiment the brine shrimp egg harvesting device 10 has a vacuum system 24 for creating the necessary vacuum force and air flow to remove the concentrated brine shrimp eggs from the water surface. In the preferred embodiment illustrated in FIG. 1, the vacuum system 24 includes a vacuum pump and holding tank similar to a conventional shop vacuum which can produce a low pressure differential and high volumetric air flow. The volumetric air flow rate is preferably in the range from about 100 cfm to 10,000 cfm and the air velocity is preferably 2000 fpm to 12,000 fpm, and most preferably between about 4000 fpm to 8000 fpm. It will be appreciated by those with skill in the art that many different types of blowers or other devices may produce the volumetric air flow rate and pressure differential capable of lifting varying depths of surface layer from a body of water.

With reference still to FIG. 1, the vacuum system 24 is connected to a nozzle 26 via a conduit 28. The nozzle 26 has an opening through which the mixture of brine shrimp eggs and water may pass. Depending on the circumstances and the application, the nozzle opening may be configured in a variety of shapes. In a presently preferred embodiment, the nozzle is configured with an elongated opening have a length in the range from greater than about 10 inches to less than about 100 inches and a width in the range from about 2 inches to about 20 inches. Most preferably the length of the elongated opening is about 24 inches and the width is about 2 inches.

Several different nozzle configurations may be used in the present invention. For instance, the nozzle opening may be circular or elliptical in shape. The diameter of circular nozzle openings is preferably in the range from about 8 inches to about 60 inches, and most preferably about 8 inches. Of course, a larger nozzle opening requires a larger or more powerful vacuum system to maintain optimum air flow rates through the nozzle opening.

As the vacuum force generated by the vacuum system 24 causes the brine shrimp egg slurry to be collected, the slurry is deposited in a holding tank 30. In the embodiment illustrated in FIG. 1, the holding tank 30 is located at the base of the vacuum system 24. One skilled in the art will recognize, however, that the holding tank can be located elsewhere.

The presently preferred embodiment has a nozzle height adjustment mechanism for maintaining the vacuum nozzle 26 in close proximity and substantially parallel to the water surface. In the illustrated embodiment, the nozzle height adjustment mechanism includes a pair of floats 32 and a pair of electric or hydraulic rams 34 capable of raising and lowering the vacuum nozzle 26 relative to the floats 32. The floats 32 should provide sufficient buoyancy to allow the vacuum nozzle 26 distance above the water surface to be adjusted. One end of rams 34 are connected to the floats 32 by brackets 36 commonly used in the field. The other end of rams 34 is attached to the vacuum nozzle 26.

The rams 34 preferably maintain the vacuum nozzle 26 a distance from about 0 inches to about 12 inches above the water surface. The use of rams 34 permits the brine shrimp egg harvester to adjust, and control the ratio of eggs to water. It is currently preferred to maintain ratio of eggs/water is in the range from 300 grams/liter to 1500 grams/liter. In the presently preferred embodiment, the desired range of eggs/water is from 600 grams/liter to 1100 grams/liter.

It will be appreciated by those with skill in the art that under certain conditions, it may be desirable to utilize more than one vacuum system, nozzle, and accompanying ram device. For instance, depending on the size of the rearward end 18 of the concentrating device, several vacuum nozzles, each with its own vacuum system and height adjustment mechanisms may be used to efficiently harvest the brine shrimp eggs.

Figure 3:
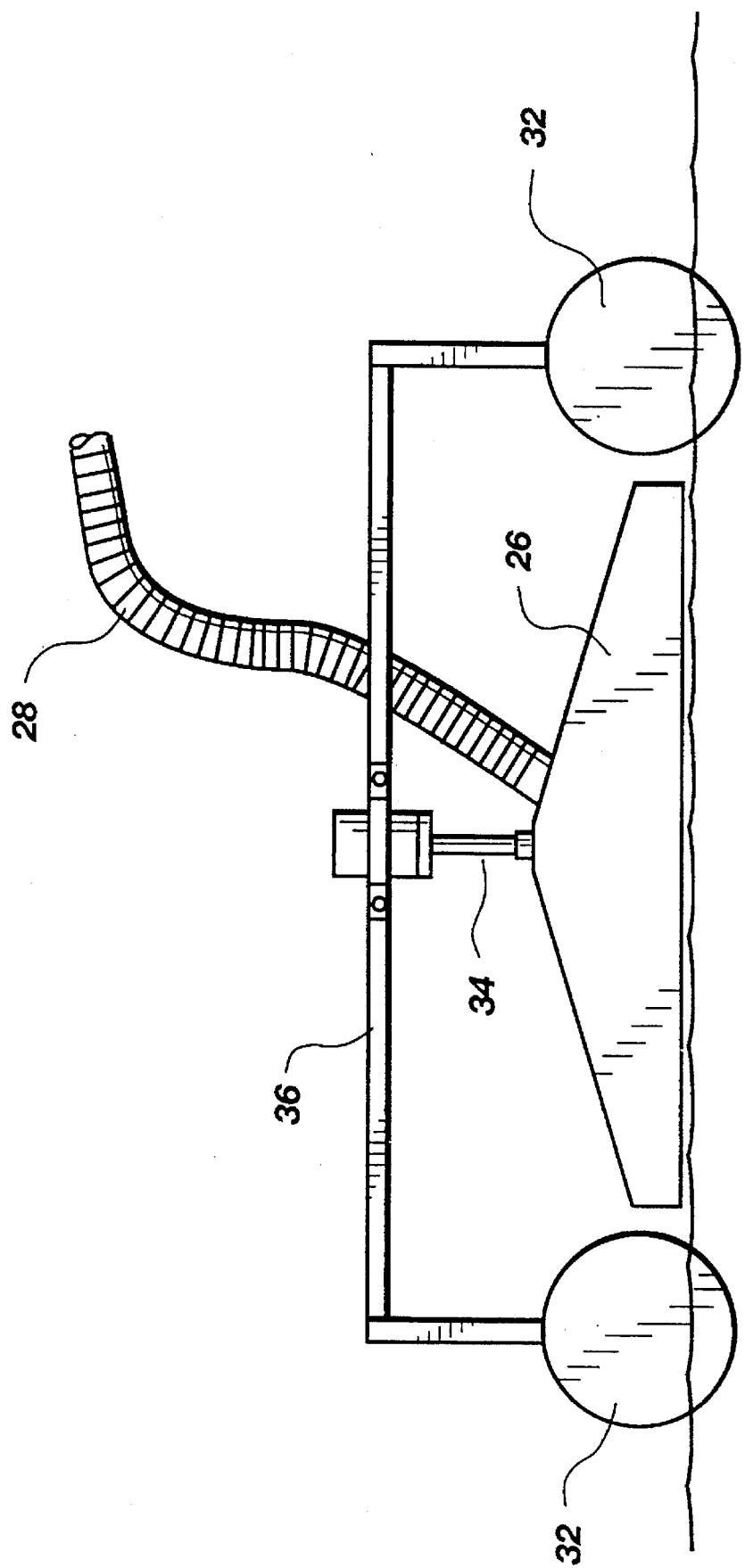
FIG. 3, is a front view of an alternative vacuum nozzle configuration within the scope of the present invention.

Referring to FIG. 3, an alternative vacuum nozzle configuration is illustrated. Rather than have a pair electric or hydraulic rams, the embodiment of FIG. 3 requires only one ram 34. A support structure 36 is attached to floats 32. The ram 34 connects the nozzle 26 to the support structure 36 such that operation of ram 34 permits the height of nozzle 26 above the water surface to be adjusted.

Referring to FIG. 1, a pump 40 is utilized to convey the brine shrimp eggs deposited in the holding tank 30 to a plurality of porous storage containers 42. The pump is preferably configured to be self priming and sealed to prevent air flow through the pump. Diaphragm and centrifugal pumps are particularly preferred. It will be appreciated that one or more pumps 40 may be used according to the present invention depending on the required pumping capacity. Each porous storage container 42 is configured such that water may drain out of the container without allowing the brine shrimp eggs to drain out. It will be appreciated by those skilled in the art that a variety of materials known in the brine shrimp egg harvesting industry may be used to allow such drainage. Additionally, the number of containers does not affect one's ability to practice this invention.

Figure 2:
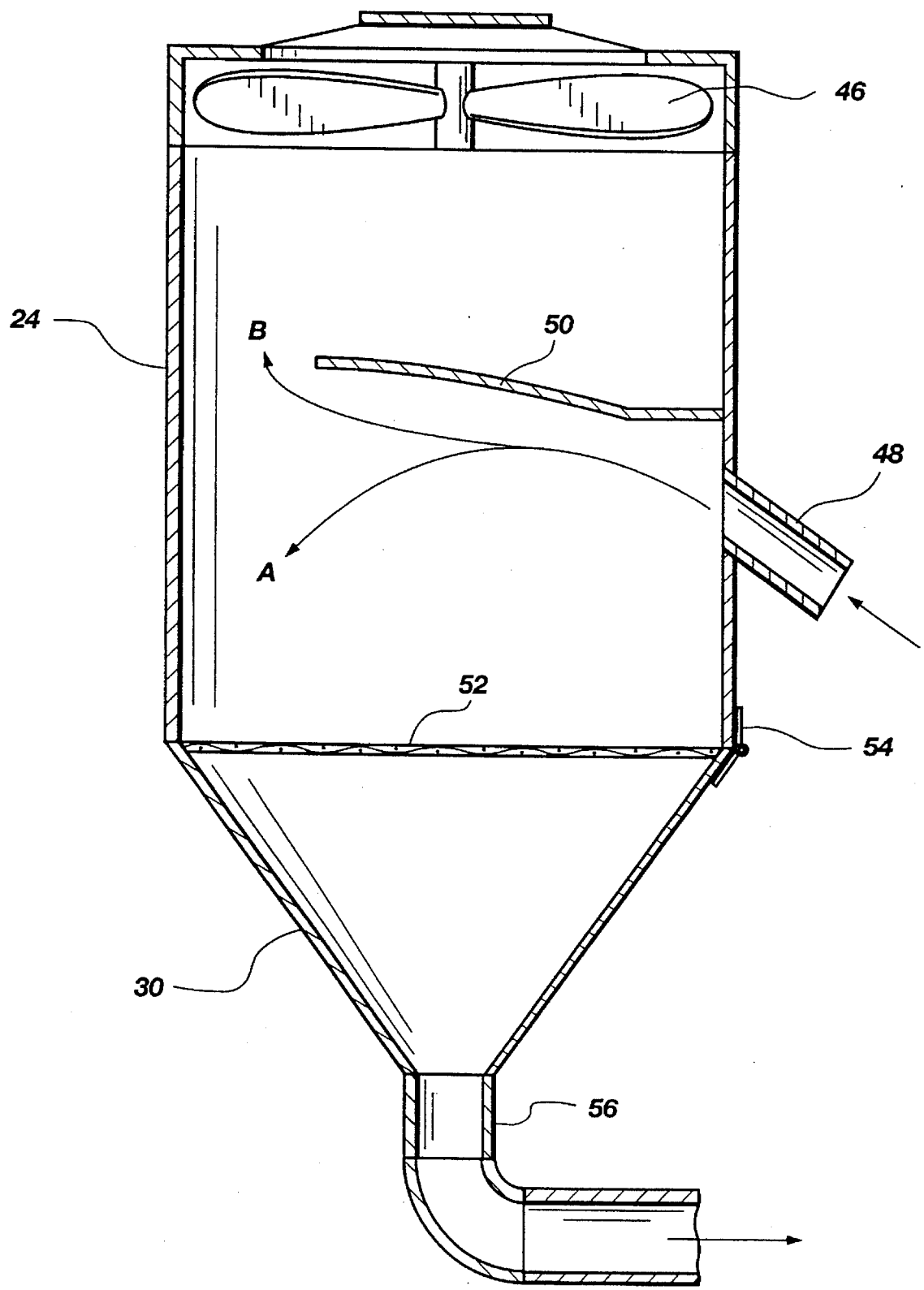
FIG. 2 is a cross-sectional view of the vacuum system illustrated in FIG. 1, taken alone line 2—2 of FIG. 1.

FIG. 2 illustrates a cross-sectional view of the vacuum blower system illustrated in FIG. 1. As shown in FIG. 2, the vacuum system includes a blower 46 for creating high volumetric air flow. The conduit 28 is preferably connected to an inlet port 48 which is configured to cause incoming air flow to impinge against deflector 50. The deflector 50 causes heavy particulates entrained within the airflow to slow down and drop by the force of gravity, as shown by arrow A. This action is similar to conventional cyclone separator designs. Un-entrained air flows past deflector 50 and through blower 46, as shown by arrow B. Blower 46 is driven by a motor (not shown), such as an electric, gas, or hydraulic motor known to persons skilled in the art. The motor used to drive blower 46 preferably permits speed adjustment such that the air flow rate can be controlled by adjusting the blower motor speed. This provides another method of controlling the ratio of brine shrimp eggs to water.

A screen 52 is provided to collect large sized debris. Screen 52 prevents debris from entering, clogging, or damaging the pump 40. The optimum screen size may vary depending on the size and type of pump used. It is currently preferred to use about 1 inch mesh screen. A hinge 54 allows the vacuum system to be opened for the purpose of cleaning the screen 52 and removing any collected debris.

The brine shrimp eggs and water pass through screen 52 into holding tank 30. A drain 56 in the bottom of holding tank 30 permits flow of the brine shrimp egg slurry into the pump 40.

From the foregoing, the present invention provides a brine shrimp egg harvester which effectively extracts the layer of brine shrimp eggs from the surface of the water regardless of natural rise and fall of the water's surface. perturbations. The present invention further provides a brine shrimp egg harvester which extracts from the surface of a body of water a relatively uniform ratio of eggs to water without agitating the water's surface. Finally, the present invention performs these functions in an efficient, cost-effective, commercial manner.

It should be appreciated that the apparatus and methods of the present invention are capable of being incorporated in the form of a variety of embodiments, only a few of which have been illustrated and described above. The invention may be embodied in other forms without departing from its essential characteristics. The described embodiments are to be considered in all respects only as illustrative and not restrictive and the scope of the invention is, therefore, indicated by the appended claims rather than by the foregoing description.

What is claimed is:

1. A device for harvesting brine shrimp eggs comprising:
    means for concentrating brine shrimp eggs floating at the surface of a body of water;
    a vacuum system using air flow for removing a surface layer containing a mixture of brine shrimp eggs and water from the body of water and depositing the mixture in a holding tank;
    a porous storage container; and
    a pumping system for conveying brine shrimp eggs from the holding tank to the porous storage container.

2. The brine shrimp harvesting device of claim 1, wherein the means for concentrating brine shrimp eggs comprises a channeling structure having diverging, wedge-oriented rigid booms defining a wide forward end and a narrow rearward end of the channeling structure configured such that as the booms move forward in relation to the floating brine shrimp eggs, the eggs are received into the wide forward end and channeled into an increasingly narrow space until they are concentrated at the rearward end of the channeling structure.

3. The brine shrimp harvesting device of claim 1, wherein the vacuum system comprises a nozzle through which a vacuum force can be directed.

4. A device for harvesting brine shrimp eggs comprising:
    means for concentrating brine shrimp eggs floating in the surface layer of a body of water having a channeling structure with diverging, wedge-oriented booms defining a wide forward end and a narrow rearward end of the channeling structure configured such that as the booms move forward in relation to the floating brine shrimp eggs, the eggs are received into the wide forward end and channeled into an increasingly narrow space until they are concentrated at the rearward end of the channeling structure;
    a vacuum system for removing a surface layer containing a mixture of brine shrimp eggs and water from a body of water comprising a nozzle through which a vacuum force can be directed and a holding tank for depositing the mixture;
    a plurality of porous storage containers; and
    a pumping system for conveying brine shrimp eggs from the holding tank to the porous storage containers.

5. The brine shrimp harvesting device of claim 4, wherein the vacuum nozzle is configured with an elongated opening.

6. The brine shrimp harvesting device of claim 5, wherein the elongated opening has a length in the range from about 10 to about 100 inches.

7. The brine shrimp harvesting device of claim 6, wherein the elongated opening has a width in the range from about 2 to about 20 inches.

8. The brine shrimp harvesting device of claim 4, wherein the vacuum nozzle is configured with a substantially circular opening.

9. The brine shrimp harvesting device of claim 8, wherein the substantially circular opening has a diameter greater than about 8 inches and smaller than about 60 inches.

10. The brine shrimp harvesting device of claim 4, wherein the vacuum nozzle includes a height adjustment mechanism to allow positioning of the nozzle at varying distances from the surface layer such that the depth of surface layer removed and the amount of water in the brine shrimp egg/water mixture can be varied.

11. The brine shrimp harvesting device of claim 4, wherein the ratio of eggs/water removed by the vacuum system is in the range from 300 grams/liter to 1500 grams/liter.

12. The brine shrimp harvesting device of claim 4, wherein the vacuum system comprises a vacuum blower for generating the vacuum force, wherein the vacuum blower generates a flow rate in the range from about 100 cfm to about 10,000 cfm.

13. The brine shrimp harvesting device of claim 4, wherein the vacuum system comprises a vacuum blower for generating the vacuum force, wherein the vacuum blower generates an air velocity rate in the range from about 2000 fpm to about 12,000 fpm.

14. The brine shrimp harvesting device of claim 4, wherein the vacuum system comprises a vacuum blower for generating the vacuum force, wherein the vacuum blower generates an air velocity rate in the range from about 4000 fpm to about 8000 fpm.

15. A device for harvesting brine shrimp eggs comprising:
 means for concentrating brine shrimp eggs floating in the surface layer of a body of water having a channeling structure with diverging, wedge-oriented booms defining a wide forward end and a narrow rearward end of the channeling structure configured such that as the booms move forward in relation to the floating brine shrimp eggs, the eggs are received into the wide forward end of the channeling structure and as the booms continue forward, the eggs are channeled into an increasingly narrow space until they are concentrated at the rearward end of the channeling structure;
 means for collecting the concentrated brine shrimp eggs comprising:
  a vacuum nozzle having an opening;
  at least one vacuum motor connected to a blower which produces sufficient air flow to lift a surface layer containing a mixture of water and brine shrimp eggs from a body of water;
  a holding tank; and
  means for maintaining the vacuum nozzle in close proximity and substantially parallel to the surface layer of the water, said means providing height adjustment to allow positioning of the nozzle at various distances from the surface layer such that the depth of surface layer removed and the amount of water in the brine shrimp egg/water mixture can be varied;
 a plurality of porous storage containers which retain the brine shrimp eggs, but allow water to drain out of the containers; and
 a pumping system for conveying brine shrimp eggs from the holding tank to the porous storage containers.

16. The brine shrimp harvesting device of claim 15, wherein the vacuum blower further generates a flow rate in the range from about 100 cfm to about 10,000 cfm.

17. The brine shrimp harvesting device of claim 15, wherein the vacuum blower further generates an air velocity rate in the range from about 2000 fpm to about 12,000 fpm.

18. The brine shrimp harvesting device of claim 15, wherein the vacuum blower further generates an air velocity rate in the range from about 4000 fpm to about 8000 fpm.

19. The brine shrimp harvesting device of claim 15, wherein the desired range of eggs/water is from 600 grams/liter to 1100 grams/liter.

20. The brine shrimp harvesting device of claim 15, wherein the means for maintaining the vacuum nozzle in close proximity to the surface layer of brine shrimp eggs further comprises:
 a float; and
 at least one ram connected at one end to the float and at another end to the vacuum nozzle for raising and lowering the vacuum nozzle in relation to the surface layer of the water.

21. The brine shrimp harvesting device of claim 20, wherein the ram maintains the vacuum nozzle from about 0 inches to about 12 inches above the water surface layer.

* * * * *